United States Patent

Rice et al.

[15] 3,646,993
[45] Mar. 7, 1972

[54] STABILIZED NICKEL OXIDE SEAL

[72] Inventors: Hal H. Rice, Birmingham; James J. Dudash, Sterling Heights, both of Mich.

[73] Assignee: General Motors Corporation, Detroit, Mich.

[22] Filed: May 18, 1970

[21] Appl. No.: 38,390

[52] U.S. Cl. ............................ 165/9, 117/93.1 PF, 277/96, 277/DIG. 6, 277/235 A
[51] Int. Cl. .......................................................... B05b 7/22
[58] Field of Search ............... 117/93.1 PF, 129, 138, 169; 277/96, DIG. 6, 224, 235 A; 29/195; 60/37.51 H; 165/9

[56] References Cited

UNITED STATES PATENTS 3,192,998   7/1965   Chute ........................................ 165/9
3,481,715  12/1969   Whalen .......................... 117/93.1 PF

*Primary Examiner*—Alfred L. Leavitt
*Assistant Examiner*—J. H. Newsome
*Attorney*—Sidney Carter and Peter P. Kozak

[57] ABSTRACT

A fluid seal for use in the rotary regenerator portion of a gas turbine engine formed by heating a mixture of NiO and 2½ to 10 percent, by weight, $Cr_2O_3$ or $Fe_3O_4$ stabilizing additive to an elevated temperature to cause a reaction therebetween and thereafter plasma spraying the heated mixture on a base member to form a NiO base seal adapted for rubbing contact with the regenerator.

5 Claims, 5 Drawing Figures

PATENTED MAR 7 1972

INVENTORS
Hal H. Rice &
BY James J. Dudash

Peter P. Kozak
ATTORNEY

STABILIZED NICKEL OXIDE SEAL

This invention relates to a rubbing contact fluid seal suitable for use in a rotary regenerator for gas turbine engine applications and, more particularly, to a nickel oxide base seal material for such applications which is resistant to deterioration by cyclic temperature changes.

Currently, there is a family of gas turbine engines which use rotating disc-type regenerators to recover useable heat from exhaust gases to preheat incoming combustion air. A necessary requirement of the regenerator system is an effective seal across the faces of the rotating disc to prevent leakage of the high pressure incoming air into the counterflowing exhaust gas. A rubbing seal is desired as it has the potential for lowest leakage. These rubbing seals are required to operate at a maximum temperature of about 600° F. on the outboard or cold side of the seal, and at temperatures up to 1,200 °F. on the inboard or hot side of the seal. The desired properties of the rubbing seal material are that it have good oxidation resistance and thermal stability, good wear resistance, a relatively low coefficient of friction over a wide range of temperatures, and that is exhibit overall compatibility with the regenerator matrix material. In addition, since the regenerator assumes a slight spheroidal inward bulge during operation, the seal must be flexible enough to conform to the shape of the regenerator.

Nickel oxide (NiO) is a desirable material for use as a seal material in a rotary regenerator since it has a relatively low coefficient of friction, is highly wear resistant and is stable in the gaseous environment of a gas turbine engine operating at elevated temperatures. However nickel oxide has a shortcoming in that it does not exhibit thermal stability due to a displacive transformation resulting from expansion and growth of the nickel oxide crystals which occurs in the temperature range from 375° to 220 °C. upon cooling from elevated temperatures. The result of this displacive transformation occurring on cooling is warping of the seal structure and scaling and spalling of the nickel oxide sealing surface. Such a transformation is, therefor, considered to be undesirable in materials that are subjected to repeated heating and cooling in service as in gas turbine engine applications.

Accordingly, it is an object of our invention to provide a rubbing contact fluid seal for use in a regenerator portion of a gas turbine engine which has relatively low friction and wear properties and which is resistant to deterioration by the cyclic temperature changes typical of those found in gas turbine engines.

It is another object of our invention to provide a relatively low-friction, low-wear nickel oxide seal material which is resistant to deterioration by cyclic temperature change.

It is yet another object of our invention to provide an additive which is effective to prevent or minimize the displacive transformation of nickel oxide on cooling from elevated temperatures.

In the preferred embodiment of our invention, these and other objects are accomplished by providing a metallic base having plasma sprayed on the surface thereof a seal material, adapted for rubbing contact with a rotating regenerator matrix, consisting essentially of nickel oxide to which has been added 2½ percent to 10 percent, by weight, $Cr_2O_3$ or $Fe_3O_4$ to stabilize the nickel oxide and thereby prevent or minimize the displacive transformation occurring on cooling from an elevated temperature.

Other objects and advantages of our invention will become more apparent from the following detailed description of the invention reference being had to the accompanying drawings, of which:

Figure 1:
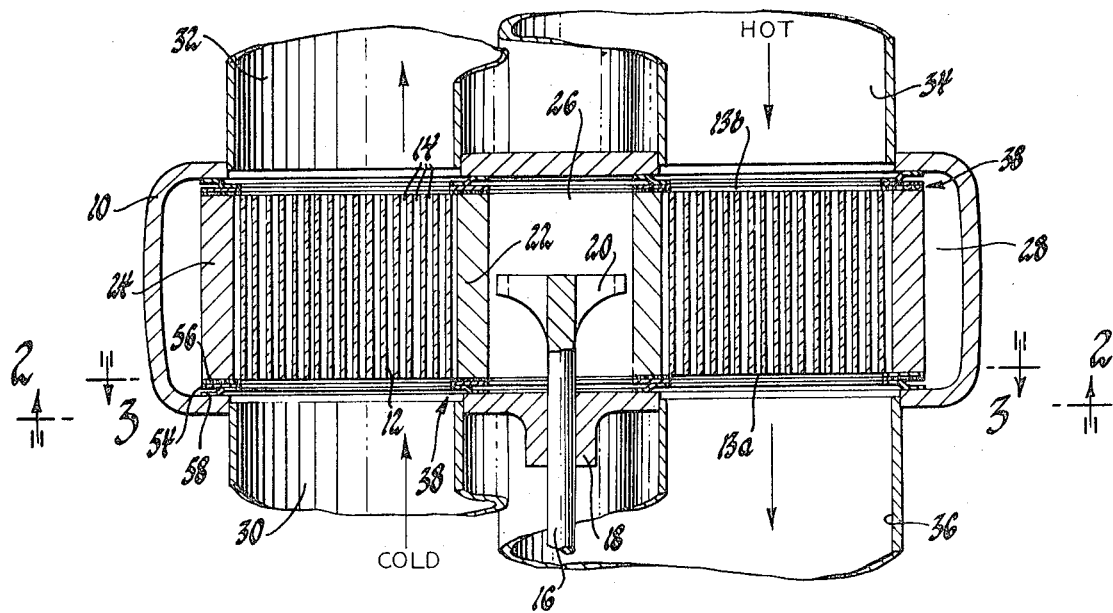
FIG. 1 is a schematic sectional view of a rotary regenerator taken on the plane indicated by line 1—1 in FIG. 2.
Figure 2:
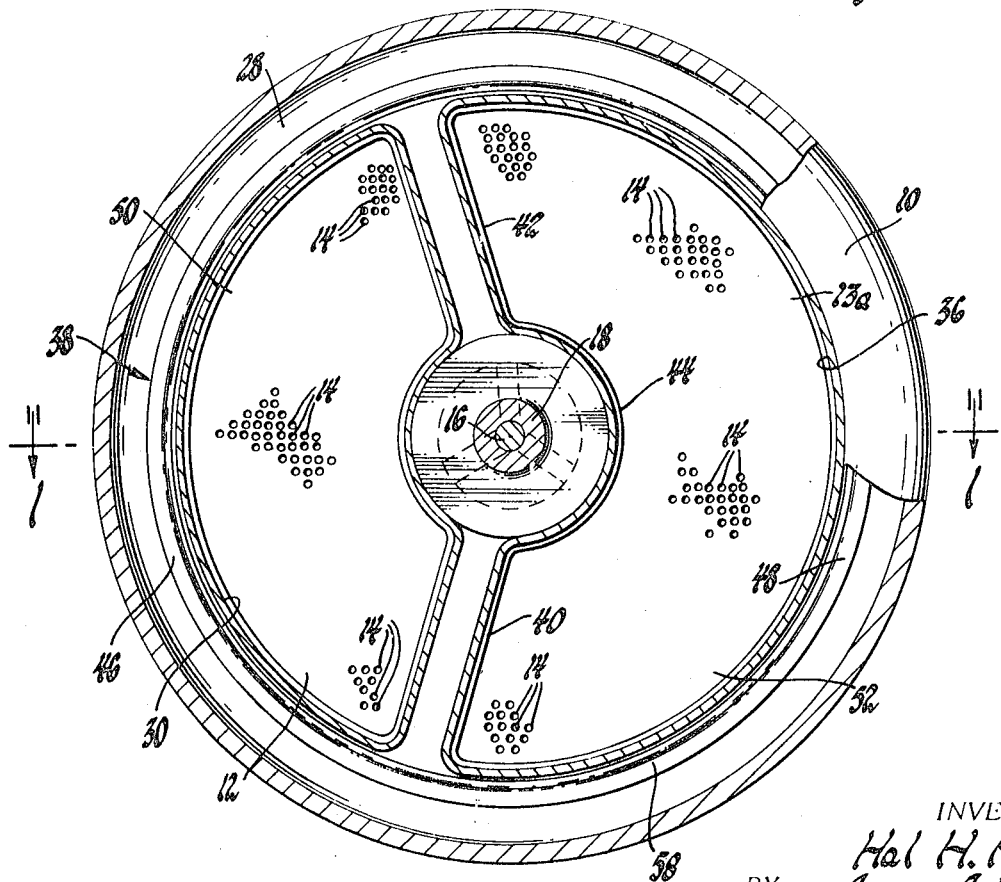
FIG. 2 is a sectional view of the same taken in a plane indicated by the line 2—2 of FIG. 1.
Figure 3:
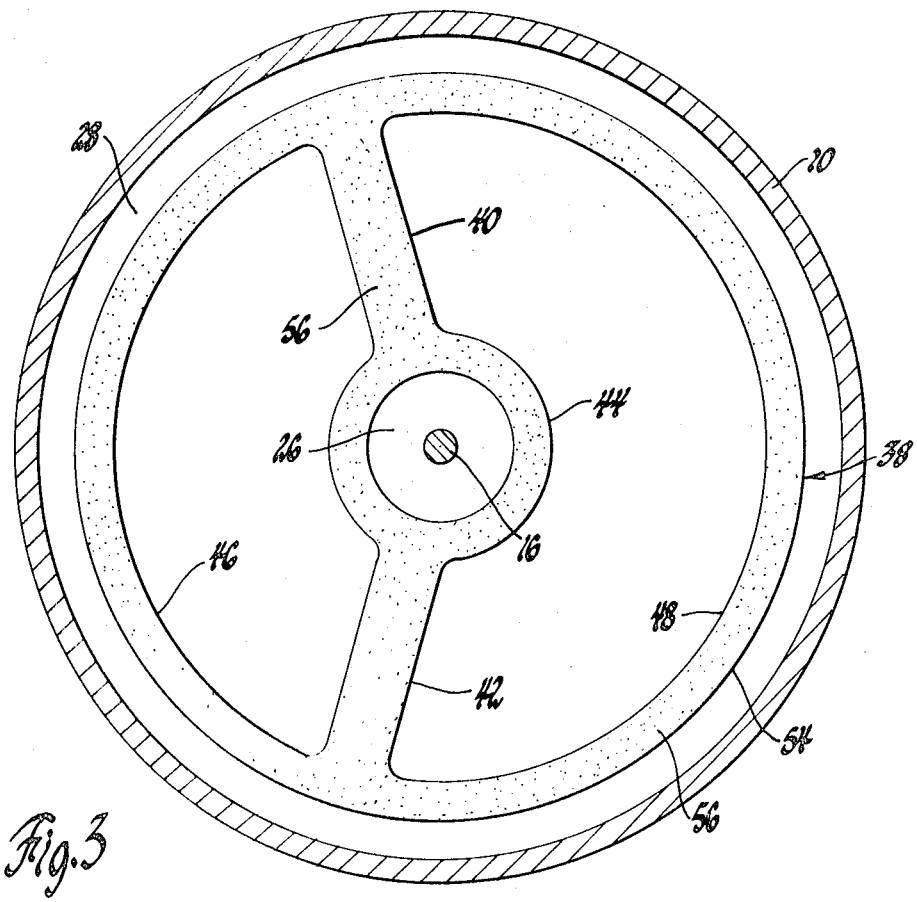
FIG. 3 is a sectional view of the same taken in a plane indicated by the line 3—3 in FIG. 1.

FIGS. 1 to 3 generally show schematically a disc-type rotary regenerator portion of a gas turbine engine (not shown). Referring first to FIG. 1, the regenerator comprises a housing 10 which is generally drum-shaped and which encloses an annular matrix 12 which is of a structure defining pores or passages 14 (greatly enlarged in FIG. 1) extending between the opposed radial faces 13a and 13b of the matrix generally parallel to the axis of rotation defined by a driving shaft 16. The matrix 12 is fabricated from alternate spiral layers of flat and corrugated stainless steel sheet stock or a ceramic. Shaft 16 is mounted in suitable bearings in a boss 18 on the housing and terminates in a spider 20 which is coupled by means (not shown) to the matrix so that the matrix may be rotated slowly. The matrix preferably includes a nonporous inner rim 22 and a nonporous outer rim 24. A generally cylindrical space 26 is defined within the interior of the matrix and a space 28 extends around the periphery of the matrix within the housing 10. An inlet 30 for cold, high pressure air enters one face of the housing and opposite to it an outlet 32 is provided for the heated compressed air. The hot, low pressure exhaust gases enter through an inlet 34 and leave the regenerator through an outlet 36, the two streams thus being in counterflow relation.

A seal 38 is provided between each radial face of the matrix and the housing in rubbing contact with the rotating matrix to confine the cold and hot gases to the desired paths through the matrix from inlet to outlet and thereby minimize leakage between the paths. As shown more clearly in FIGS. 2 and 3, such a seal comprises two arms 40 and 42 extending radially of the matrix base preferably joined at the inner rim of the matrix by a circular seal portion 44 extending around the interior cavity 26 and joined at the outer rim of the matrix by an arcuate rim or bypass seal 46 extending around the high pressure path and an arcuate rim seal 48 extending around the low pressure path. The seal assembly thus defines an opening 50 for the cold, high pressure air and an opening 52 for the hot, low pressure exhaust gas. These openings, as shown in FIG. 2, conform generally in the outline of the ducts 30 and 32, and 34 and 36, respectively.

The seal 38 in rubbing contact with the matrix 12 comprising portions defining the arms 40 and 42, the inner seal portion 44 and the outer seal portion comprised of arcs 46 and 48, as indicated in FIGS. 2 and 3, is comprised of a stationary base member 54 which is a flat sheet of metal, for example, a stainless steel sufficiently thick to be reasonably stiff and rigid, but sufficiently flexible to curve slightly in accordance with any distortion of the matrix, and a layer 56 of seal material which is plasma sprayed on the forward or matrix face of the base 54, as shown in FIG. 3. During engine operation, the seal is held against the regenerator by a gas pressure differential between the high pressure incoming air and the low pressure exhaust such that the layer 56 is continuously in rubbing contact with the rotating matrix 12. The pressure differential also acts to hold flexible metal leaf seals 58 which are welded to the base 54 against the adjacent housing 10.

The nickel oxide seal layer 56 embodying this invention is formed by first preparing a mixture of from 2½ percent to 10 percent, by weight, of a metal oxide chosen from the group consisting of $Cr_2O_3$ and $Fe_3O_4$ with the balance being NiO. The nickel oxide and the additive are dry mixed in a plastic V-blender for 1 hour and then passed through a 100-mesh sieve to insure homogeneity. The mixture is then reacted in an alumina crucible at 2,000 °F. for 1 hour during which a solid state reaction takes place between the nickel oxide and the additive to form either $NiCr_2O_4$ or $NiFe_2O_4$ depending on the additive used. The solid state reaction is a time-temperature relation, and therefore, when lower reaction temperatures are used, longer times are required in order to react the mixture. The reacted mixture is then applied to the base member portion 54 of the seal 38 by plasma spraying. The parameters for plasma spraying nickel oxide are well known in the art and are applicable to plasma spraying the reacted nickel oxide mixture. Typical parameters are 40 DC volts at 500 DC amperes.

In order to demonstrate the effectiveness of the metal oxide additive in minimizing or preventing the nickel oxide displacement transformation, 2×1×¼ inch test blocks of plasma spray material prepared by the above-described method were made from which thermal expansion samples were cut. The thermal expansion samples were cycled between room temperature and 760° C. at a heating rate of approximately 200 °C. per hour with the samples being furnace cooled at about 200°C. per hour down to 200°C. Below 200 °C. the rate decreased as room temperature was approached.

Figure 4:
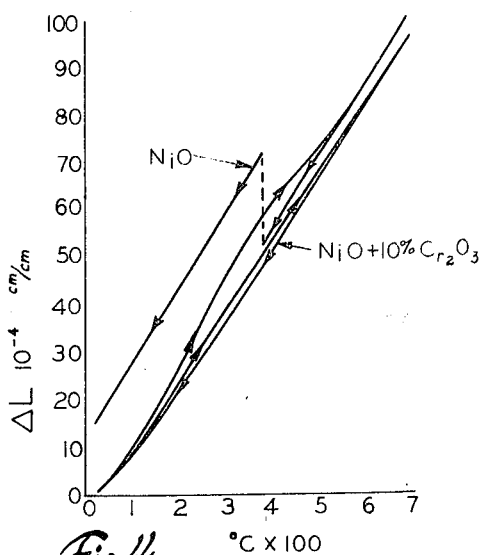
FIG. 4 is a graph showing the thermal expansion of plasma sprayed nickel oxide material after 15 thermal cycles to 760° C.

Referring now to FIG. 4, there is shown typical thermal expansion results for plasma sprayed specimens of nickel oxide without an additive and for plasma sprayed specimens of nickel oxide with a 10 wt. percent $Cr_2O_3$ addition. The thermal expansion on heating of the NiO specimen was generally linear with the coefficient of thermal expansion upon cooling being greater initially than that upon heating. Upon cooling, it was observed that a rapid expansion occurred at about 300°C. (Dotted Line) resulting in a net growth of the sample at room temperature. The growth associated with cycling was found to be cumulative to 15 cycles, the maximum number of cycles given the specimens, with a mean increase in height per cycle of the specimens of 0.00034 inch per cycle for a 0.27-inch-thick sample. The rapid expansion of the plasma sprayed NiO at 300°C. upon cooling is characterized as a displacive transformation and it is this transformation which results in warping, scaling and spalling of NiO seal material in regenerator seal applications. Referring again to FIG. 4, there is shown the results of a thermal cycling test of NiO stabilized with 10 wt. percent $Cr_2O_3$. It may be seen that the stabilized NiO material did not display a displacive transformation upon cooling and showed no growth at room temperature after thermal cycling.

Figure 5:
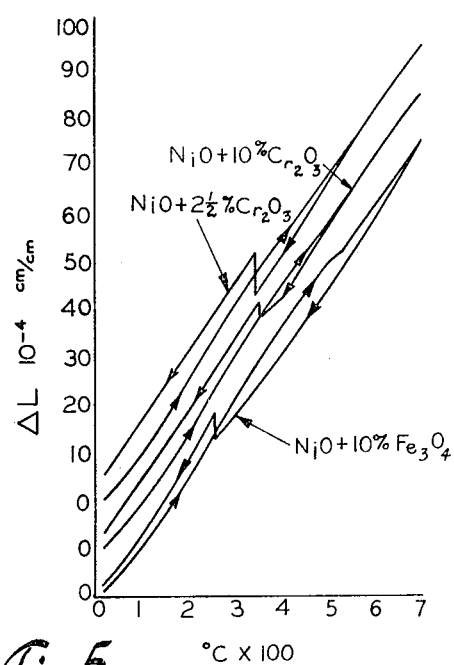
FIG. 5 is a graph showing the effect of additions on the thermal expansion behaviors of plasma sprayed nickel oxide after 15 thermal cycles.

Referring now to FIG. 5 there is shown the effect of 2½ percent $Cr_2O_3$, 10 percent $Fe_3O_4$ and 10 percent $Cr_2O_3$ on the suppression of the displacive transformation normally found in nickel oxide upon thermal cycling. It may be seen that the addition of as little as 2½ percent $Cr_2O_3$ considerably reduced the displacement transformation of the NiO and that a 10 percent $Fe_3O_4$ addition was also effective in reducing the displacive transformation.

The exact mechanism by which the addition of $Cr_2O_3$ and $Fe_3O_4$ to nickel oxide eliminates the displacement transformation is not known. However, X-ray defraction studies at both room temperature and elevated temperature have indicated that the additive material either enters into the solid solution with the nickel oxide or forms a nickel complex, $NiCr_2O_3$ or $NiFe_2O_3$, in the NiO. It is believed that either of these reactions, in effect, distorts the nickel oxide lattice and, thereby, stabilizes the nickel oxide material against crystal structure changes on cooling. It has been further found that calcining the reacted material at 1,100 °C. and then plasma spraying the calcined material on the seal base member increases the density of the seal material to 5.80 grams per cc. as compared to a density of 5.63 grams per cc. for uncalcined material. Calcining has also been found to be effective increasing the sprayability of the reacted material.

A number of solid lubricants may be incorporated in the reacted nickel oxide material during plasma spraying to provide a rubbing seal material with improved frictional and wear characteristics. We have found that up to about 10 wt. percent addition of $CaF_2$ is effective in reducing the coefficient of friction of the seal material without substantially affecting the displacive characteristics of the stabilized material.

From the foregoing, it will be apparent to those skilled in the art that the addition of $Cr_2O_3$ or $Fe_3O_4$ to nickel oxide when prepared as above-described, has the effect of stabilizing the nickel oxide against displacive transformation thereby providing a seal material having relatively low friction and low wear characteristics which is resistant to deterioration by cyclic temperature changes typical of those found in gas turbine engine operation. Although our invention has been described in terms of preferred embodiments with reference to a particular rotary regenerator structure, it will be appreciated that other forms may be adopted within the scope of our invention. For example, in many regenerator operations, the outboard or cold side of the seal and the rim of the hot side seal operate at less than 800° F. In this case, our seal material may be replaced in these regions with graphite which has a substantially lower coefficient of friction than our seal material, but which oxidizes above 800° F., with our seal material being used only on seal regions which operate at temperatures up to 1,200 °F.

Thus having described our invention, what is claimed is:

1. A rubbing contact fluid sealing member comprising a base member and a nickel oxide seal layer adapted for rubbing contact with another member bonded to at least a portion of said base, said layer being the reaction product of heating a mixture consisting essentially of, by weight, 2½ to 10 percent of a metal oxide chosen from the group consisting of $Cr_2O_3$ and $Fe_3O_4$ and balance NiO for a time and at a temperature sufficient to substantially completely react the constituents of said mixture, said layer having been applied by plasma spraying said heated mixture on said base.

2. A fluid sealing member as defined in claim 1 wherein said mixture consists essentially of, by weight, about 10 percent $Cr_2O_3$ balance NiO.

3. A rubbing contact fluid sealing member comprising a base member and a nickel oxide seal layer adapted for rubbing contact with another member bonded to at least a portion of said base, said layer being the reaction product of heating a mixture consisting essentially of, by weight, 2½ to 10 percent of a metal oxide chosen from the group consisting of $Cr_2O_3$ and $Fe_3O_4$ and balance NiO for a time and at a temperature sufficient to substantially completely react the constituents of said mixture and of calcining said heated mixture at an elevated temperature, said layer having been applied by plasma spraying said calcined mixture with up to about 10 percent, by weight, $CaF_2$ on said base.

4. A fluid seal for use in the rotary regenerator portion of a gas turbine engine, said portion including a housing adapted to enclose a rotating regenerator matrix, said seal comprising a stationary metal base member and nickel oxide seal layer bonded to at least a portion of said base, and means for retaining said base member between said housing and said matrix with said layer being adapted for rubbing contact with said rotating regenerator matrix, said layer being the reaction product of heating a mixture consisting essentially of, by weight, 2½ to 10 percent of a metal oxide chosen from the group consisting of $Cr_2O_3$ and $Fe_3O_4$ and balance NiO for a time and at a temperature sufficient to substantially completely react the constituents of said mixture, said layer having been applied by plasma spraying said heated mixture on said base.

5. A fluid seal as defined in claim 4 wherein said mixture consists essentially of, by weight, about 10 percent $Cr_2O_3$ balance NiO.

* * * * *